W. S. HILL.
Circular-Saw.
No. 214,390.  Patented April 15, 1879.
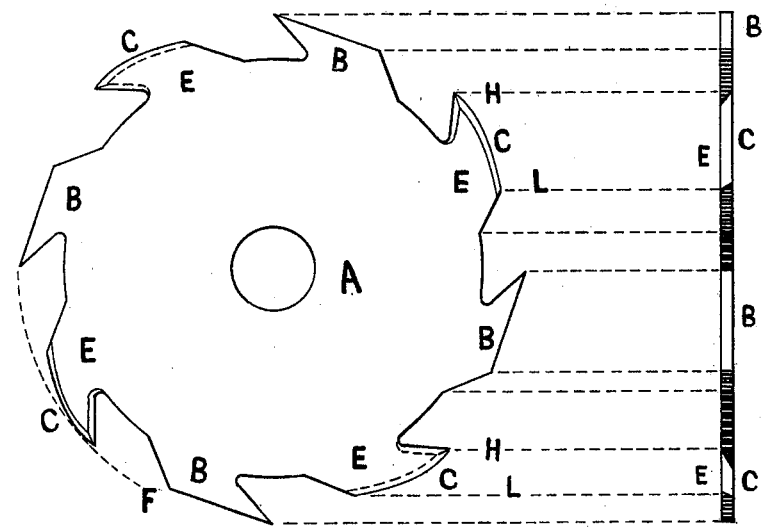
Witnesses:
H. S. Talbot
W. R. Marble
Inventor:
Warren S. Hill,
By Sylvenus Walker
Att'y

UNITED STATES PATENT OFFICE.

WARREN S. HILL, OF BOSTON, MASSACHUSETTS, ASSIGNOR TO JOSEPH A. ROBBINS, OF SAME PLACE.

IMPROVEMENT IN CIRCULAR SAWS.

Specification forming part of Letters Patent No. 214,390, dated April 15, 1879; application filed January 30, 1879.

*To all whom it may concern:*

Be it known that I, WARREN S. HILL, of Boston, in the county of Suffolk and State of Massachusetts, have invented certain new and useful Improvements in Circular Saws, of which the following is a specification.

The object of my invention is to provide circular saws with segmental tops or rear cutting-surfaces, which nearly correspond with the circumference of the saw, so as to cut more easily, smoothly, and freely than saws heretofore constructed having round-pointed teeth; and it consists in the construction, combination, and arrangement of the beveled segmental backed teeth with the usual clearing-teeth, as hereinafter more fully described and set forth.

Figure 1 shows a side elevation of a saw constructed according to my invention. Fig. 2 shows an edge elevation of the same.

A represents the saw-plate, provided with hooked pointed clearing-teeth B, as usual. E represents the beveled cutting-teeth having segmental ends or backs C, corresponding nearly to the circumference of the saw, as shown by the curved or segmental dotted line F in Fig. 1, which line shows a segment of a circle of the circumference of the saw, and shows that the beveled cutting top or back C of the tooth inclines slightly toward the center of the saw from its point or forward edge, H, to its rear, L, so as to allow the succeeding clearing-tooth B to cut or clear the kerf freely of the sawdust formed by the cutting-teeth E, which are beveled to the right and left alternately, and are located or formed alternately with the clearing-teeth B, as shown in the drawings. Their front edges or faces are beveled in like manner from point to base, leaving sharp hooked beveled points, as shown in Fig. 1.

Having thus described my invention, what I claim is—

In combination with a circular saw, A, having clearing-teeth B, the beveled cutting-teeth E, having curved segmental ends C extending from their cutting-points H to their rear L, and corresponding nearly with the circumference of the saw, substantially as shown and described, as and for the purposes set forth.

WARREN S. HILL.

Witnesses:
SYLVENUS WALKER,
W. M. PARKER.